United States Patent
Jain et al.

(10) Patent No.: US 8,447,976 B2
(45) Date of Patent: May 21, 2013

(54) BUSINESS TO BUSINESS SECURE MAIL

(75) Inventors: Chandresh K. Jain, Sammamish, WA (US); Mayank Mehta, Redmond, WA (US); Frank D. Byrum, Seattle, WA (US); Edward Banti, Seattle, WA (US); Ayse Yesim Koman, Seattle, WA (US); James R. Knibb, Kirland, WA (US); Michael A. Nelte, Redmond, WA (US); Christopher Barnes, Redmond, WA (US); Hao Zhang, Sammamish, WA (US); Victor Boctor, Redmond, WA (US); Tejas D. Patel, Seattle, WA (US); Yuhui Zhong, Sammamish, WA (US); Gregory Kostal, Kirkland, WA (US); Vladimir Yarmolenko, Duvall, WA (US); Pankaj M. Kamat, Kirkland, WA (US); Amit K. Fulay, Kirkland, WA (US); Krassimir E. Karamfilov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/476,049

(22) Filed: Jun. 1, 2009

(65) Prior Publication Data
US 2010/0306535 A1 Dec. 2, 2010

(51) Int. Cl.
*H04L 9/32* (2006.01)
(52) U.S. Cl.
USPC .............................................. 713/168; 726/9
(58) Field of Classification Search
USPC ............................. 726/4; 713/168
See application file for complete search history.

(56) References Cited

U.S. PATENT DOCUMENTS

| | | | |
|---|---|---|---|
| 6,584,564 B2 | 6/2003 | Olkin et al. | |
| 6,721,784 B1 | 4/2004 | Leonard et al. | |
| 7,149,893 B1 | 12/2006 | Leonard et al. | |
| 7,210,165 B2 * | 4/2007 | Speare et al. | 726/4 |
| 7,228,334 B1 | 6/2007 | Jordan, Jr. | |
| 7,289,964 B1 | 10/2007 | Bowman-Amuah | |
| 7,325,127 B2 | 1/2008 | Olkin et al. | |
| 7,412,605 B2 | 8/2008 | Raley et al. | |
| 7,475,248 B2 | 1/2009 | Barrus et al. | |
| 7,500,096 B2 | 3/2009 | Lang et al. | |
| 7,590,693 B1 | 9/2009 | Chan et al. | |
| 7,593,532 B2 | 9/2009 | Plotkin et al. | |

(Continued)

FOREIGN PATENT DOCUMENTS

JP 2005-202715 7/2005

OTHER PUBLICATIONS

U.S. Appl. No. 12/479,235, Office Action mailed Dec. 12, 2011, 16 pgs.

(Continued)

*Primary Examiner* — Gilberto Barron, Jr.
*Assistant Examiner* — Devin Almeida
(74) *Attorney, Agent, or Firm* — Merchant & Gould, P.C.

(57) ABSTRACT

Business to business secure mail may be provided. Consistent with embodiments of the invention, a protected message may be received. The recipient may request a token from a trust broker, submit the token to an authorization server associated with the sender, receive a user license from the authorization server; and decrypt the protected message using the user license. The protected message may restrict actions that may be taken by the recipient, such as forwarding to other users.

20 Claims, 3 Drawing Sheets

U.S. PATENT DOCUMENTS

| | | | |
|---|---|---|---|
| 7,730,142 | B2 | 6/2010 | LeVasseur et al. |
| 2003/0110377 | A1 | 6/2003 | Chapman |
| 2004/0133775 | A1 | 7/2004 | Callas et al. |
| 2004/0148356 | A1 | 7/2004 | Bishop et al. |
| 2005/0138353 | A1 | 6/2005 | Spies et al. |
| 2005/0251865 | A1 | 11/2005 | Mont et al. |
| 2006/0064581 | A1* | 3/2006 | Miller et al. ............. 713/156 |
| 2006/0149823 | A1 | 7/2006 | Owen et al. |
| 2006/0248575 | A1 | 11/2006 | Levow et al. |
| 2006/0282784 | A1 | 12/2006 | Taylor et al. |
| 2007/0005716 | A1 | 1/2007 | LeVasseur et al. |
| 2007/0056047 | A1 | 3/2007 | Claudator et al. |
| 2007/0101159 | A1 | 5/2007 | Zhang et al. |
| 2007/0180227 | A1 | 8/2007 | Akimoto |
| 2007/0234417 | A1 | 10/2007 | Blakley III et al. |
| 2008/0086530 | A1 | 4/2008 | Gandhi et al. |
| 2008/0189213 | A1 | 8/2008 | Blake et al. |
| 2008/0313699 | A1 | 12/2008 | Starostin et al. |
| 2009/0006851 | A1 | 1/2009 | Freeman et al. |
| 2009/0077381 | A1 | 3/2009 | Kanungo et al. |
| 2009/0097662 | A1 | 4/2009 | Olechowski et al. |
| 2009/0198997 | A1* | 8/2009 | Yeap et al. ............. 713/155 |
| 2010/0313016 | A1 | 12/2010 | Zhang et al. |
| 2010/0313276 | A1 | 12/2010 | Banti et al. |

OTHER PUBLICATIONS

U.S. Appl. No. 12/479,235, Amendment and Response filed Mar. 12, 2012, 12 pgs.

International Search Report dated Dec. 24, 2010 PCT/US2010/036966 9 pgs.

ArtistScope DRM Client 1.3—Total control for Document Rights Management, Sof t411.com, http://www.soft411.com/company/ArtistScope/ArtistScope-DRM-Client.htm, 2 pages (Mar. 6, 2009).

Bustamante, M., "Building a Custom Security Token Service," *Microsoft Corporation*, http://msdn.microsoft.com/en-us/magazine/2009.01.genevests(printer).aspx, pp. 1-8 (Copyright 2009).

CenturionMail, http://www.centurionsoft.com/centurionmail/, *CenturionSoft*, pp. 1-2 (Copyright 2003).

eCipher Pro®—Easy Email Encryption, *Essential Security Software*, http://www.essentialsecurity.com/products.html, 1 page (Copyright 2009).

Eliminating Your SSL Blind Spot: The solution to managing—and—securing HTTPS traffic, *White Paper, Secure Computing Corporation*, http://www.silicon.com/i/s/wp/spnsr/securecomputing/WW-SSL-WPAug06vF1.pdf, pp. 1-9 (Aug. 2006).

EMC Documentum Information Rights Management Services, *EMC Corporation*, http://www.emcinside.com/product.asp?productID=6, 1 page (Copyright 2009).

Enterprise Security Solutions using Adobe® LiveCycle® Rights Management ES, *Adobe* http://www.adobe.com/devnet/livecycle/pdfs/rm_security_tg.pdf, pp. 1-6 (Mar. 2009).

Exchange Deployment Planning Services, Antivirus Protection, http://www.partneredps.com/documents/10day/Engagement%20Presentations/Workshop%20-%20Deck%2012%20-%20Antivirus%20Protection.pptx, 18 pages (Publicly known at least as early as Apr. 7, 2009).

How to perform an email scan to protect against viruses, *TechTarget ANZ*, http://searchsecurity.techtarget.com.au/tips/18203-How-to-perform-an-email-scan-to-protect-against-viruses, pp. 1-3 (Jun. 12, 2006).

Jøsang, A. et al., "Usability and Privacy in Identity Management Architectures," *Australasian Information Security Workshop: Privacy Enhancing Technologies (AISW)*, Ballarat, Australia, pp. 143-152 (Copyright 2007).

Liquid Machines and Microsoft Windows Rights Management Services (RMS): End-to-end Rights Management for the Enterprise, *White Paper*, http://www.cmdsolutions.com/pdfs/LiquidMachines%20Windows%20RMS%20Business%20White%20Paper%20FINAL%20060213.pdf, pp-1-16 pages (Feb. 2006).

Microsoft Exchange Server 2007, Securing Internet Messaging With Exchange Server 2007, *Microsoft Corporation*, http://download.microsoft.com/download/F/8/D/F8D504BF-9DC4-485E-84E2-30595581A6D1/Securing%20Internet%20Messaging%20with%20Microsoft%20Exchange%20Server%202007.doc, pp. 1-25 (Nov. 2006).

Microsoft Federation Gateway, *Microsoft Corporation*, http://msdn.microsoft.com/en-us/library/cc287610(printer).aspx, pp. 1-22 (Nov. 2008).

Oracle Data Sheet, Using Information Rights to Extend Oracle Universal Content Management Security, *Oracle*, http://www.oracle.com/products/middleware/content-management/docs/ucm-irm-integration-datasheet.pdf, pp. 1-2 (Copyright 2008).

Secure messaging, *Wikipedia*, http://en.wikipedia.org/wiki/Secure_messaging, pp. 1-4 (Mar. 3, 2009).

Understanding Windows Live Delegated Authentication, *Microsoft Corporation*, http://msdn.microsoft.com/en-us/library/cc287613(printer).aspx, pp. 1-7 (Oct. 2008).

U.S. Appl. No. 12/478,608, filed Jun. 4, 2009, entitled "Transport Pipeline Decryption for Content-Scanning Agents".

U.S. Appl. No. 12/479,235, filed Jun. 5, 2009, entitled "Web-Based Client for Creating and Accessing Protected Content".

U.S. Appl. 12/478,608, Office Action mailed Apr. 26, 2012, 21 pgs.

U.S. Appl. 12/479,235, Office Action mailed Jul. 17, 2012, 12 pgs.

U.S. Appl. 12/479,235, Amendment and Response filed Oct. 17, 2012, 10 pgs.

U.S. Appl. 12/479,235, Office Action mailed Jan. 3, 2013, 12 pgs.

\* cited by examiner

BUSINESS TO BUSINESS SECURE MAIL

RELATED APPLICATION(S)

Related U.S. patent application Ser. No. 12/478,608 filed on Jun. 4, 2009 and entitled "Transport Pipeline Decryption For Content-Scanning Agents" assigned to the assignee of the present application, is hereby incorporated by reference.

Related U.S. patent application Ser. No. 12/479,235 filed on Jun. 5, 2009 and entitled "Web-Based Client for Creating and Accessing Protected Content" assigned to the assignee of the present application, is hereby incorporated by reference.

BACKGROUND

Business to business secure mail is a process for providing secure messaging between organizations. In some situations, organizations must perform cumbersome key distributions or explicit configurations for each other organization they wish to communicate with securely. For example, a manufacturing company may need to set up different encryption key pairs and configurations for each of its supplier companies. Thus, the conventional strategy is to set up a new secure transport for each new organization with whom secure communication is desired. This often causes problems because the conventional strategy does not scale efficiently. For example, a company may have hundreds of other organizations for which it must manage separate security mechanisms.

SUMMARY

Business to business secure mail may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Business to business secure mail may be provided. Consistent with embodiments of the invention, a protected message may be received. The recipient and/or a device acting on behalf of a recipient may request a token from a trust broker, submit the token to an authorization server associated with the sender, receive a user license from the authorization server; and decrypt the protected message using the user license. The protected message may restrict actions that may be taken by the recipient, such as forwarding to other users.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
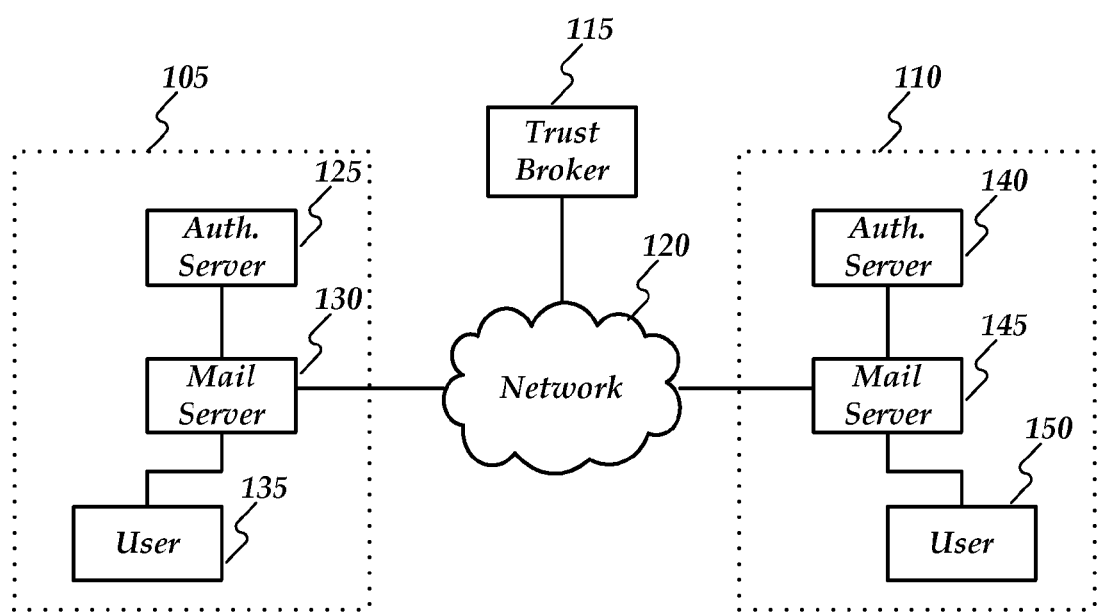
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Business to business secure mail may be provided. Consistent with embodiments of the present invention, an organization may wish to communicate securely with several other organizations. Rather than requiring each organization to configure a different encryption/decryption scheme for every other organization, organizations may each federate with a trust broker once. The organizations may then request tokens from the trust broker in order to decrypt messages protected by any other federated organization.

FIG. 1 is a block diagram of an operating environment 100 that may utilize business to business secure mail. Operating environment 100 may comprise a first organization 105, a second organization 110, and a trust broker 115 that may communicate via a network 120. First organization 105 may comprise a first authorization server 125, a first mail server 130, and a first user 135. Second organization 110 may comprise a second authorization server 140, a second mail server 145, and a second user 150. For example, trust broker 115 may comprise a Microsoft® Windows Live® federation server, as produced by Microsoft® Corporation of Redmond, Wash. Trust broker 115 may also comprise a server associated with one of the participating organizations, such as where a manufacturer maintains a trust broker operative to federate each of its suppliers. Mail servers 130 and 145 may each comprise an Exchange® server, also produced by Microsoft® Corporation of Redmond, Wash. First user 135 may comprise a computing device such as computing device 300, described below with respect to FIG. 3, used by a sender of a message. Second user 150 may also comprise a computing device used by a recipient of the message. Network 120 may comprise a public network, such as the Internet, a cellular data network, a VPN, or other communication medium. Although examples are provided with respect to an e-mail message, the methods described may be applied to any protected electronic document that may be shared among different users.

Figure 2:
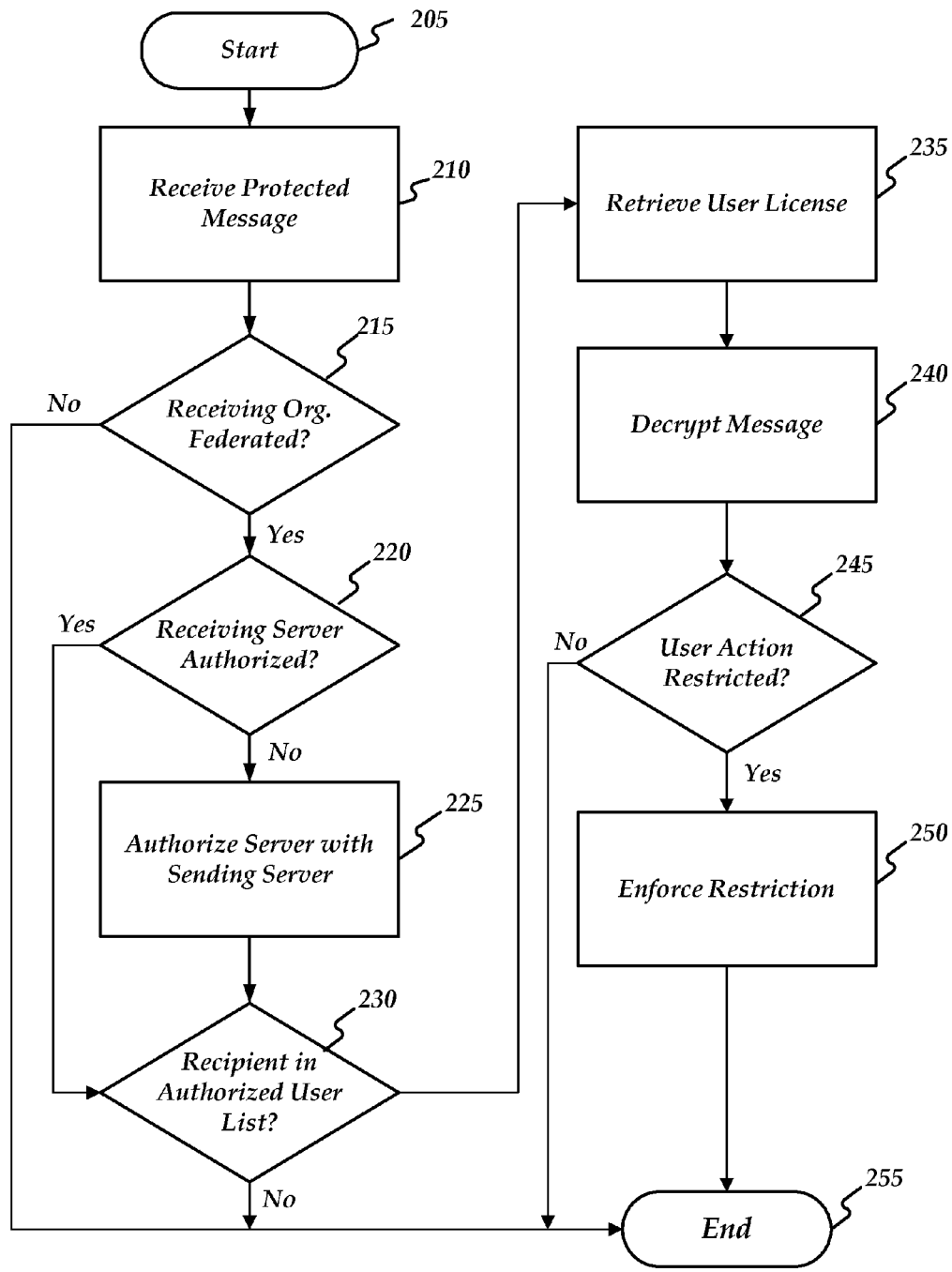
FIG. 2 is a flow chart of a method for providing business to business secure mail.

FIG. 2 is a flow chart setting forth the general stages involved in a method 200 consistent with an embodiment of the invention for providing business to business secure mail. Method 200 may be implemented using computing device 300 as described in more detail below with respect to FIG. 3. Ways to implement the stages of method 200 will be described in greater detail below. Method 200 may begin at starting block 205 and proceed to stage 210 where computing device 300 may receive a protected message. For example, second user 150 may receive a message created and/or sent by first user 135. Second user 150 and/or second mail server 145 may determine that the message is protected against an authorization server associated with another organization, such as first authorization server 125 associated with first organization 105. If the message is determined to be protected against an authorization server associated with the receiving user's own organization, such as second authorization server 140, the receiving user (e.g. second user 150) may request decryption functionality from that authorization server. Consistent with embodiments of the invention, second mail server 145 and/or second user 150 may comprise a list of authorization servers associated with second organization 110.

From stage 210, where computing device 300 received the protected message, method 200 may advance to stage 215 where computing device 300 may determine whether the receiving organization is federated. Federating with a trust broker may comprise a one-time operation to establish an organization's identity, such as by proving ownership of a domain name.

Second mail server 145 may determine whether the protection on the message is associated with a trust broker with which second organization 110 has been federated, such as trust broker 115. If the receiving organization is not federated with the trust broker associated with the message's protection, method 200 may end at stage 255 without decrypting the message.

Once computing device 300 determines that the receiving organization is federated in stage 215, method 200 may continue to stage 220 where computing device 300 may determine whether the receiving mail server has a rights certificate from the trust broker and/or an authorization server associated with the sender. For example, second mail server 145 may determine whether a rights certificate has been previously received and cached from trust broker 115 and/or first authorization server 125.

If the rights certificate has not been previously received and/or a previously cached rights certificate has expired, method 200 may advance to stage 225 where computing device 300 may authorize with the sending mail server. For example, the protected message may comprise a network location identifying first authorization server 125 associated with first organization 105. The network location may comprise, for example, a uniform resource identifier (URI) and/or a uniform resource locator (URL) and may be transmitted as an unencrypted portion of the protected message. The network location may be validated as a properly formed network address.

Consistent with embodiments of the invention, second mail server 145 may determine whether first authorization server 125 is online and/or whether a valid network connection, such as network 120, exists between first organization 105 and second organization 110. Second mail server 145 may request a delegated token from trust broker 115 for first authorization server 125. The delegated token may comprise verification of the identity of second organization 110. Second mail server 125 may submit the delegated token to first authorization server 125 and receive the rights certificate comprising at least one permission that second mail server 145 may be granted for processing protected messages received from first organization 105. Requesting the rights certificate may comprise providing a machine certificate associated with computing device 300, an email address associated with the organization, the network location of the sending organization's authorization server, and/or a federated domain name associated with the receiving organization to the trust broker.

Consistent with embodiments of the invention, the protected message may comprise a property field, such as an X-header in an e-mail message, that may indicate whether a message may be decrypted by the receiving organization on behalf of a pipeline agent. Consistent with further embodiments of the invention, the indication may be present in a publishing license associated with the protected message and may be signed with the sending organization's key. When a use license is requested, the publish license may be presented as a part of the request and the sending server may validate whether the publish license is valid (e.g. if the signature has been altered and/or tampered with). An invalid publishing license and/or a publishing license that restricts content scanning may result in a rejection of the use license request on behalf of the pipeline agent. For example, second organization may wish to decrypt a received message for scanning by an anti-virus and/or spam filter pipeline agent. The property may be set as part of a template applied by the sending user.

If a cached rights certificate is available and/or once a new rights certificate is received from the trust broker, method 200 may advance to stage 230 where computing device 300 determine whether the receiving user is in a list of recipients associated with the protected message. For example, if second user 150 is not an intended recipient of the message, first authorization server 125 may refuse to issue a use license and method 200 may end at stage 255 without decrypting the message.

If the authorization server associated with the sending organization cannot be contacted, such as due to a network disruption or the server being offline, a negative entry may be cached for subsequent messages associated with that authorization server. This may help mitigate attacks crafted against a fake authorization server. Consistent with embodiments of the invention, a negative cache may comprise a separate data store that may contain a list of fake and/or offline authorization servers. The cache entries may have an expiration time. Further consistent with embodiments of the invention, cache entries may be propagated to other authorization servers associated with the receiving organization and/or other organizations. Negative cache entries may be created when an authorization server may be contacted, but may not be configured to respond to authorization requests.

If computing device 300 determines that the receiving user is an intended recipient of the protected message in stage 230, method 200 may proceed to stage 235 where computing device 300 may retrieve a user license for the receiving user from the sender's authorization server. For example, second user 150 may receive a user token from second authorization server 140 and/or trust broker 115 and may submit the user token to first authorization server 125. First authorization server 125 may verify that the user token is associated with federated second organization 110 and provide a user license to second user 150. Authentication to the decryption services may be performed based on the user token, and may comprise a Security Assertion Markup Language (SAML) token issued by an authorization server. The request for the token may comprise properties such as an email address and/or a requesting domain. The delegated token may be retrieved by second authorization server 140, second user 150, and/or second mail server 145.

Consistent with embodiments of the invention, a recipient may have an aliased address. For example, second mail server 145 may alias user addresses associated with incoming messages, such as changing "user@company.com" to "user@mail.company.com" and/or "user@subsidiary.com". An alias may also comprise a single address that may result in distribution of messages to a plurality of users, such as "team@company.com" comprising a group address for "user1@company.com," "user2@company.com," and "user3@othercompany.com." Consistent with embodiments of the invention, trust broker 115 may refuse to provide the delegated token needed if the user is associated with the aliased address. Alternately, the receiving organization may provide a list of all aliases associated with a receiving user when requesting the delegated token. Trust broker 115 may validate that domains listed in the aliased address is federated for the requesting organization and may add the alias address claims to the delegated token that may be presented to the sending organization's authorization service. Consistent with further embodiments of the invention, the receiving user may select one of the addresses associated with their account for submission to the trust broker. The original recipient list may be preserved with the message and/or a receiving user may successively submit each alias address associated with the user until the delegation token provided by trust broker 115 for each alias is accepted by first authorization server 125 and a valid user license is returned.

Consistent with embodiments of the invention, an authorization server may be operative to provide an audit report to a sending user. For example, the sending user may be notified when a user license is issued for at least one message recipient.

Once computing device 300 receives the user license in stage 235, method 200 may advance to stage 240 where computing device 300 may decrypt the protected message. For example, second user 150 may utilize the information contained in the user license and rights certificate to decrypt the message.

After computing device 300 decrypts the message in stage 240, method 200 may advance to stage 245 where computing device 300 may receive a requested action to perform on the message and determine whether the requested action is restricted. For example, second user 150 may attempt to forward the message to a new recipient at a third organization, but the message may comprise a restriction protecting the message from being forwarded to such recipients. Consistent with embodiments of the invention, a client application operable to display the decrypted message and receive action requests may be further operable to identify restricted actions associated with the protected message. The client application may then determine whether an action requested by a user falls within the identified restrictions. Restrictions may comprise, for example, a prohibition against forwarding the message to another recipient, a prohibition against modifying the contents of the message, a requirement that a confidentiality notice be included, a prohibition against printing the message, a prohibition against replying to the message, a prohibition against replying to all recipients and/or the sender, and/or prohibiting archiving to a third party organization.

If, at stage 245, computing device 300 determines that the requested action is restricted, method 200 may advance to stage 250 where computing device 300 may enforce the restriction. For example, the client application associated with second user 150 may not forward a protected message with a restriction prohibiting forwarding. Consistent with embodiments of the invention, computing device 300 may notify first authorization server 125 of an attempted violation of the restriction. After enforcing the restriction at stage 250, or if a requested user action is not restricted at stage 245, method 200 may then end at stage 250. If the requested action is not restricted, second user 150 may protect the message using the same and/or other restrictions against second authorization server 140 prior to sending it to another user.

An embodiment consistent with the invention may comprise a system for providing secure mail. The system may comprise a memory storage and a processing unit coupled to the memory storage. The processing unit may be operative to receive a protected message from a sender, request a receiving user token from a trust broker, submit the receiving user token to an authorization server associated with the sender, receive a user license issued by the authorization server, and decrypt the protected message using the user license.

Another embodiment consistent with the invention may comprise a system for providing secure communication. The system may comprise a memory storage and a processing unit coupled to the memory storage. The processing unit may be operative to receive, by a user associated with a receiving organization, a protected message comprising a list of authorized recipients from a user associated with a sending organization, determine whether the user associated with the receiving organization is included in the list of authorized recipients, and request a user token from a trust broker. The processing unit may be further operative to submit the user token to an authorization server associated with the sending organization, receive a user license from the authorization server associated with the sending organization, and use the received user license to decrypt the protected message for the user associated with the receiving organization.

Yet another embodiment consistent with the invention may comprise a system for providing secure mail between organizations. The system may comprise a memory storage and a processing unit coupled to the memory storage. The processing unit may be operative to receive, by a user associated with a receiving organization, a protected message comprising a list of authorized recipients from a user associated with a sending organization, determine whether the receiving organization comprises a rights certificate associated with the sending organization, request an organization token from a trust broker, send the organization token to an authorization server associated with the sending organization, receive the rights certificate associated with the sending organization, and cache the rights certificate associated with the sending organization. The processing unit may be further operative to determine whether the user associated with the receiving organization is included in the list of authorized recipients, request a user token from a trust broker, send the user token to the authorization server associated with the sending organization, receive a user license from the authorization server associated with the sending organization, decrypt the protected message for the user associated with the receiving organization using the rights certificate and the user license, and enforce at least one restriction associated with the protected message.

Figure 3:
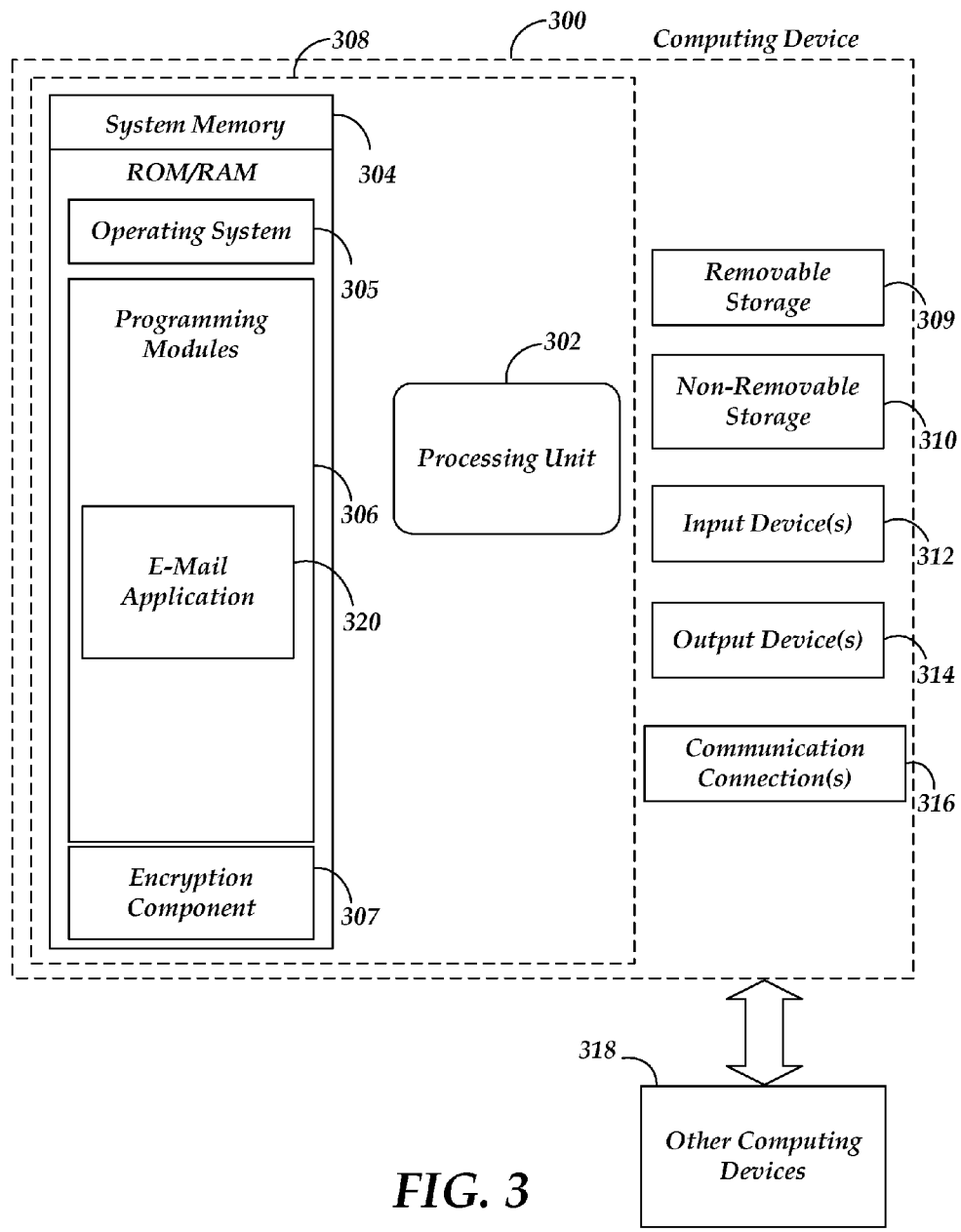
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include an encryption component 307. Operating system 305, for example, may be suitable for controlling computing device 300's operation. In one embodiment, programming modules 306 may include a client e-mail application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. client e-mail application 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing secure mail, the method comprising:
   receiving, at a recipient device, a protected message from a sender device associated with a first organization, wherein the recipient device is associated with a second organization, and wherein the first and second organizations are different;
   requesting a receiving user token from a trust broker, wherein requesting the receiving user token comprises submitting a list of two or more email aliases associated with the receiving user token, wherein the two or more email aliases are federated with the trust broker;
   submitting the receiving user token to an authorization server associated with the sender device;
   receiving a user license issued by the authorization server; and
   decrypting the protected message using the user license.

2. The method of claim 1, further comprising:
   prior to requesting the receiving user token from the trust broker, determining whether the message protection is associated with another organization; and
   in response to determining that the message protection is associated with another organization, receiving a local user license to decrypt the protected message from an authorization server associated with the another organization.

3. The method of claim 1, further comprising federating the first and the second organizations with the trust broker prior to requesting the receiving user token.

4. The method of claim 1, wherein the protected message comprises at least one accepted trust broker.

5. The method of claim 1, wherein the protected message comprises an authorization allowing decryption of the message by a pipeline agent.

6. The method of claim 1, further comprising notifying the sender device when the user license is issued by the authorization server associated with the sender device.

7. The method of claim 1, wherein the protected message comprises a network location for the authorization server associated with the sender device.

8. The method of claim 1, wherein the user license prohibits the protected message from being sent to at least one other recipient.

9. The method of claim 1, further comprising:
   receiving a list of authorized recipients associated with the protected message;
   determining whether the list of authorized recipients includes a user submitting the receiving user token to the authorization server associated with the sender device; and
   in response to determining that the list of authorized recipients does not include the user submitting the receiving user token to the authorization server associated with the sender device, refusing to issue the user license.

10. The method of claim 1, further comprising:
    receiving a list of authorized recipients associated with the protected message;
    determining whether the list of authorized recipients includes a receiving user requesting the receiving user token from the trust broker; and
    in response to determining that the list of authorized recipients does not include the receiving user requesting the receiving user token from the trust broker, refusing to issue the receiving user token.

11. The method of claim 1, further comprising:
    receiving no response from the authorization server associated with the sender device; caching the authorization server in a list of unavailable authorization servers;
    receiving a second protected message from a sending organization associated with the unavailable authorization server; and
    discarding the second protected message.

12. A computer readable storage medium storing a set of instructions that when executed by a processor, cause the processor to perform a method, the method comprising:
    receiving, by a first device associated with a first user who is associated with a receiving organization, a protected message from a second device associated with a second user who is associated with a sending organization, wherein the protected message comprises a list of authorized recipients, wherein the receiving organization is different from the sending organization;
    determining whether the first user is included in the list of authorized recipients; in response to determining that the first user is included in the list of authorized recipients, requesting a user token from a trust broker, wherein requesting the user token from the trust broker comprises submitting a list of two or more email aliases, wherein the two or more email aliases are federated with the trust broker;
    submitting the user token to an authorization server associated with the sending organization;
    receiving a user license from the authorization server associated with the sending organization; and
    using the received user license to decrypt the protected message for the first user.

13. The computer readable storage medium of claim 12, wherein the receiving organization and the sending organization have federated with the trust broker.

14. The computer readable storage medium of claim 12, further comprising decrypting the message for access by a pipeline agent.

15. The computer readable storage medium of claim 12, wherein the protected message comprises a network location for the authorization server associated with the sending organization.

16. The computer readable storage medium of claim 12, further comprising: receiving no response from the authorization server associated with the sending organization; and creating a negative cache entry identifying the authorization server associated with the sending organization as unavailable.

17. The computer readable storage medium of claim 16, further comprising: receiving a second protected message from a third device associated with a third user who is associated with the sending organization; identifying the authorization server associated with the sending organization as unavailable according to the negative cache entry; and discarding the second protected message.

18. The computer readable storage medium of claim 12, wherein two or more email aliases are associated with the first user.

19. The computer readable storage medium of claim 18, wherein requesting the user token further comprises requesting a user token associated with at least one of the two or more email aliases from the trust broker.

20. A system for providing secure mail between organizations, the system comprising:
   a memory storage; and
   a processing unit coupled to the memory storage, wherein the processing unit is operative
   to:
   receive, by a first device associated with a first user who is associated with a receiving organization, a protected message from a second device associated with a second user who is associated with a sending organization, wherein the protected message comprises a list of authorized recipients, wherein the receiving organization and the sending organization are different;
   determine whether the receiving organization comprises a rights certificate associated with the sending organization;
   in response to determining that the receiving organization does not comprise a rights certificate associated with the sending organization:
   request an organization token from a trust broker,
   send the organization token to an authorization server associated with the sending organization,
   receive the rights certificate associated with the sending organization, and cache the rights certificate associated with the sending organization; determine whether the first user is included in the list of authorized recipients; in response to determining that the first user is included in the list of authorized recipients, request a user token from a trust broker, wherein the request includes submitting a list of two or more email aliases associated with the user token, wherein the two or more email aliases are federated with the trust broker;
   send the user token to the authorization server associated with the sending organization;
   receive a user license from the authorization server associated with the sending organization;
   decrypt the protected message for the first user using the rights certificate and the user license; and
   enforce at least one restriction associated with the protected message.

* * * * *